March 19, 1957 F. G. SPELLIER 2,786,091
VENT PLUG
Filed March 31, 1954
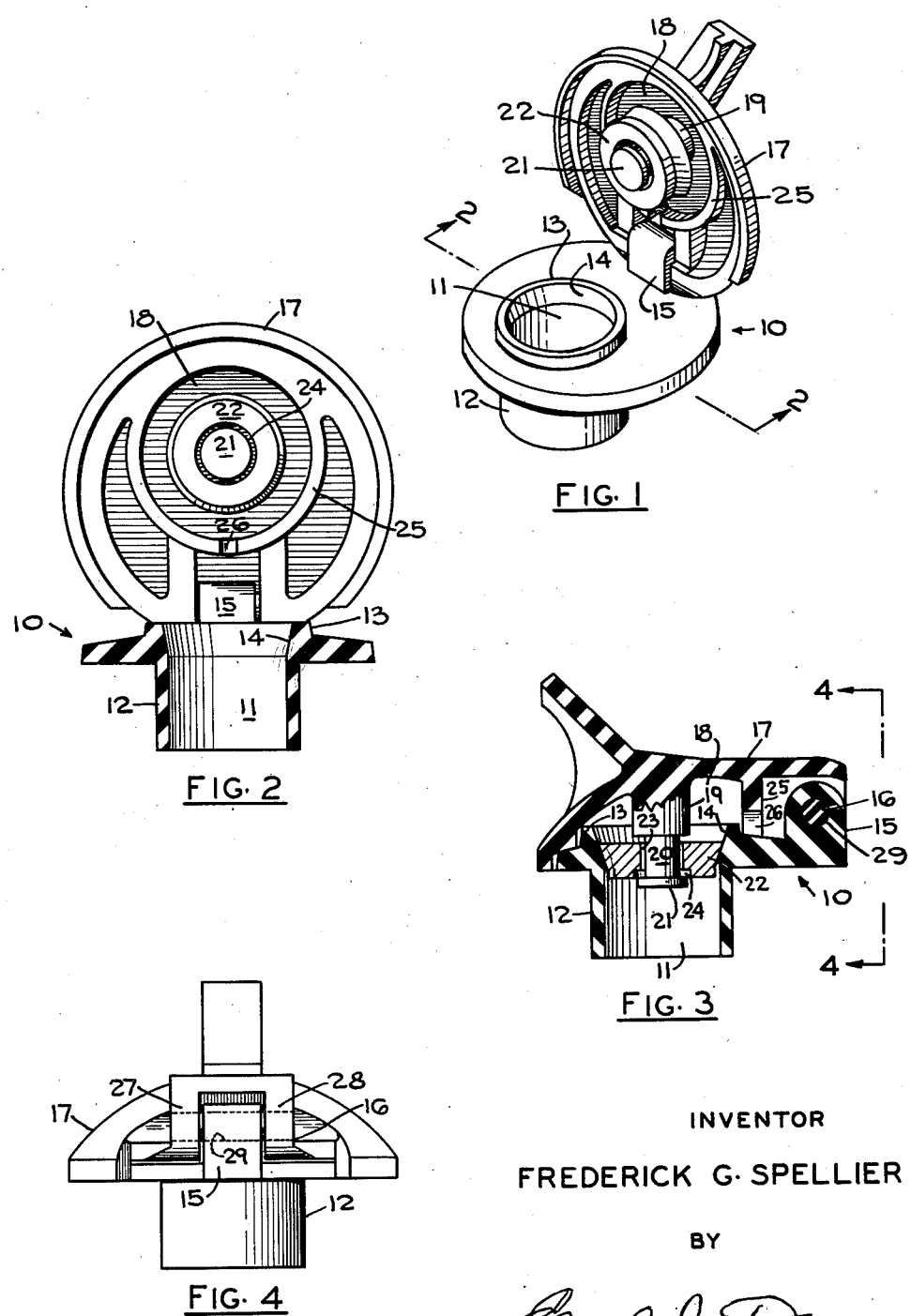
INVENTOR
FREDERICK G. SPELLIER
BY
ATTORNEY United States Patent Office 2,786,091
Patented Mar. 19, 1957

2,786,091
VENT PLUG

Frederick G. Spellier, Cheltenham, Pa., assignor to The Electric Storage Battery Company, a corporation of New Jersey Application March 31, 1954, Serial No. 419,955

3 Claims. (Cl. 136—178)

The invention relates to improvements in electric storage batteries of the lead-acid type, and more particularly to improvements in the vent plugs for use in such batteries.

The vent plug to be hereinafter described and claimed is particularly adaptable for use in those batteries designed for service in connection with carlighting and airconditioning units on railroad trains, service on industrial trucks, and other fields where vibration is encountered and where adding water to the battery is or may be a problem by reason of the number of cells in the battery, inconvenient installations, lack of head-room or the like.

In its broadest aspects, the invention is particularly directed toward and has for an object the production of a hinged type of vent plug comprising a novel arrangement of the parts thereof such that the same part functions as a baffle for spray or gases evolved from the battery and as a stabilizer for the hinged cap member whether such cap is in an open or a closed position.

Another object of the invention is to provide a hinged type of vent plug having improved safeguards against accidental sloppage of electrolyte, and in addition to these improved safeguards having increased efficiency in the venting of gases evolved within the battery.

Referring now to the drawing, wherein like numerals are used to indicate like parts, Figure 1 is a perspective view showing the vent plug of the invention in the open or filling position;

Figure 2 is an elevational view partially in cross section taken along the line 2—2 of Figure 1;

Figure 3 is an elevational view in cross section showing the vent plug in the closed or operative position;

Figure 4 is an elevational view taken along the line 4—4 of Figure 3.

In the drawing, the numeral 10 indicates generally the body portion of the vent plug having a filling opening 11 defined by a downwardly depending skirt 12. It will be understood that skirt 12 is adapted to be inserted into and remain seated within a corresponding opening in the cover of a storage battery (not shown). Skirt 12 can be provided with threads, bayonet joints, or other conventional mechanical expedients to engage with similar arrangements in the cover or can be adapted, as here shown, for merely frictional engagement with the cover.

The upper portion of filling opening 11 is surrounded by collar 13 extending upwardly from body portion 10, the collar being bevelled or countersunk internally to form a seat 14. Body portion 10 is also provided with a lug or ear 15 containing an opening 16 to permit a hinged connection with cap member 17 such as will be hereinafter described.

Cap member 17, as here shown and preferably constructed, is substantially dome shaped and contains a hollow chamber 18. Integrally formed with said cap member and extending downwardly therefrom is a hollow sleeve 19 adapted to receive rod 20 which is provided with a shoulder 21 on the lower end thereof. A metallic ring 22, preferably of lead or lead alloy, having a central opening 23 and counterbored as at 24 is loosely mounted on rod 20 and arranged for limited travel thereon between shoulder 21 and sleeve 19, the thickness of said ring being somewhat less than the distance between said shoulder and said sleeve. It will be understood that, if desired, sleeve 19 and rod 20 can be molded integrally with cap member 17. If this is done, shoulder 21 will be affixed to the lower end of rod 20 after ring 22 is mounted thereon.

Also formed integrally with the underside of cap member 17 is a flange 25 so constructed as to fit around collar 13 and contact body portion 10. Flange 25 is provided with a slot or other opening such as is shown at 26.

The hinged connection between cap member 17 and body portion 10 is provided by a pair of projections 27 and 28 respectively adapted to coact with lug 15 and having openings corresponding to opening 16. Hinge pin 29 extends through projections 27 and 28 and lug 15 providing the necessary connection.

In the open or filling position (Figure 1), ring 22 is in the retracted position on rod 20 and in contact with hollow sleeve 19. In this position, the center of gravity of cap member 17 as affected by ring 22 is slightly beyond a vertical line drawn through the center of hinge pin 29 so that said cap member will remain stabilized in the open position while water is being added to the battery. If, however, the cap is not positively closed at the end of the filling operation, the balance is so gauged that the ordinary vibration encountered during use of the battery will joggle the cap sufficiently to return it to the closed position.

Since ring 22 fits loosely on rod 20, it will automatically fit itself properly on seat 14 when the cap is closed. In this position, ring 22 is held on seat 14 slightly spaced from shoulder 21. Accordingly, any gases evolved within the cell during charging will be safely vented therefrom through a tortuous path provided by the clearance between ring 22 and rod 20, slot 26, and around lug 15 and projections 27 and 28 to the atmosphere. At the same time, accidental spillage or sloppage of electrolyte is reduced to a minimum by the effects of baffles such as shoulder 21, ring 22, the lower end of sleeve 19, and the combination of collar 13 and flange 25.

In accordance with the above description, therefore, it will be seen that the objects of the invention have been achieved and there has been provided a novel hinged type vent plug containing improved means permitting the venting of gases without damage from spray or loss of electrolyte. The foregoing description is exemplary only and other forms and variations coming within the scope of the appended claims will be apparent to those skilled in the art.

What is claimed is:

1. In a storage battery including a container and a cover therefor, a vent plug comprising a body portion having a filling opening therein and a collar surrounding said opening, a cap member hinged to said body portion and having a downwardly extending flange adapted to contact said collar when in a closed position, a retaining rod affixed to said cap member, and stabilizing-baffle means positioned on said rod and slideable to a limited extent thereon for closing said filling opening, said stabilizing-baffle means being spaced from said rod when the filling opening is closed to provide a vent passage between said stabilizing-baffle means and said rod.

2. In a storage battery including a container and a cover therefor, a vent plug comprising a body portion having a filling opening therein and a collar surrounding said opening, a cap member hinged to said body portion and having a downwardly extending flange adapted to surround said collar when in a closed position, said flange being provided with vent means for venting gases from said battery, a retaining rod affixed to said cap member, and stabilizing-baffle means positioned on said rod and slideable to a limited extent thereon for closing said filling opening, said stabilizing-baffle means being spaced from said rod when the filling opening is closed to provide a vent passage between said stabilizing-baffle means and said rod.

3. In a storage battery including a container and a cover therefor, a vent plug comprising a body portion having a filling opening therein and a collar surrounding said opening, a cap member hinged to said body portion and having a downwardly extending flange adapted to surround said collar when in a closed position, said flange being provided with a vent opening extending above said collar for venting gases from said battery, a retaining rod affixed to said cap member, a pair of spaced shoulders on said rod, and a lead alloy ring slideably positioned on said rod between said shoulders for closing said filling opening, said ring being spaced from said rod and said shoulders when the filling opening is closed to provide a circuitous vent passage between said ring, said rod and said shoulders.

References Cited in the file of this patent

UNITED STATES PATENTS

| | | |
|---|---|---|
| 2,480,437 | Berg et al. | Aug. 30, 1949 |
| 2,649,495 | Kennedy | Aug. 18, 1953 |